(12) United States Patent
Buffenmeyer

(10) Patent No.: US 10,051,992 B1
(45) Date of Patent: Aug. 21, 2018

(54) CAMPRFIRE GRILL APPARATUS

(71) Applicant: Douglas Buffenmeyer, Annville, PA (US)

(72) Inventor: Douglas Buffenmeyer, Annville, PA (US)

( * ) Notice: Subject to any disclaimer, the term of this patent is extended or adjusted under 35 U.S.C. 154(b) by 91 days.

(21) Appl. No.: 14/501,619

(22) Filed: Sep. 30, 2014

(51) Int. Cl.
*A47J 37/06* (2006.01)
*A47J 37/07* (2006.01)
*A47J 33/00* (2006.01)
*F24B 3/00* (2006.01)

(52) U.S. Cl.
CPC ..................................... *A47J 33/00* (2013.01)

(58) Field of Classification Search
USPC ........... 126/25 R, 25 A, 29, 30, 9 R; 99/357, 99/395, 340, 421 HV
See application file for complete search history.

(56) References Cited

U.S. PATENT DOCUMENTS

| | | | | |
|---|---|---|---|---|
| 102,886 A * | 5/1870 | Unglish | ................. | B07B 1/286 209/344 |
| 1,824,165 A * | 9/1931 | Miller | ................. | F16M 11/16 211/181.1 |
| 2,466,496 A * | 4/1949 | Smith | ................. | A47J 33/00 126/30 |
| 2,573,988 A * | 11/1951 | Saltzberg | ............ | A47J 37/0731 126/25 A |
| 2,709,996 A * | 6/1955 | Tescula | ................ | A47J 37/0731 126/25 R |
| 3,013,550 A * | 12/1961 | Murchie | ............. | A47J 37/0763 126/25 A |
| 3,152,536 A * | 10/1964 | Lucas | ................. | A47J 37/0763 126/30 |
| 3,783,855 A * | 1/1974 | Newinger | ........... | A47J 37/0731 126/25 R |
| 4,024,851 A * | 5/1977 | Boda | ................... | A47J 37/0763 126/30 |
| 4,120,280 A * | 10/1978 | Iverson | ............... | A47J 37/0763 126/30 |
| 4,535,749 A * | 8/1985 | Schlosser | ............ | A47J 37/0763 126/25 R |
| 4,612,851 A * | 9/1986 | McManus | ............... | A47J 33/00 126/30 |
| 4,679,543 A * | 7/1987 | Waltman | .................. | A47J 37/06 126/25 R |
| 4,732,138 A * | 3/1988 | Vos | ....................... | A47J 37/046 126/25 A |
| 4,909,235 A * | 3/1990 | Boetcker | ................... | F24C 1/16 126/25 C |
| 5,025,715 A * | 6/1991 | Sir | .......................... | A47J 33/00 126/30 |
| 5,099,821 A * | 3/1992 | Ceravolo | ................. | A47J 37/07 126/242 |
| 5,355,867 A | 10/1994 | Hall et al. | | |
| 5,406,931 A | 4/1995 | Montgomery | | |
| (Continued) | | | | |

*Primary Examiner* — Steven B McAllister
*Assistant Examiner* — Desmond C Peyton
(74) *Attorney, Agent, or Firm* — Michael J. Feigin, Esq.; Cheryl R. Figlin, Esq.; Feigin and Fridman

(57) ABSTRACT

A grill apparatus for use with an open fire and tripod suspension. The grill apparatus having a wall, two grill members and a rotation bracket. The wall is used to protect the food from falling off the grill. The grills rotate inside and between the bracket ends. The second grill member used to expose the second side of the food to the fire.

12 Claims, 4 Drawing Sheets

(56) References Cited

U.S. PATENT DOCUMENTS

| | | |
|---|---|---|
| 5,452,706 A | 9/1995 | Meza |
| 5,660,101 A | 8/1997 | Cirigliano |
| 5,848,584 A | 12/1998 | Brog |
| 5,931,148 A * | 8/1999 | Freeman ............. A47J 37/0704 |
| | | 126/25 A |
| 5,944,008 A * | 8/1999 | Winkel ................ A47J 37/0763 |
| | | 126/25 A |
| 5,983,882 A * | 11/1999 | Ceravolo ............ A47J 37/0704 |
| | | 126/25 A |
| 6,105,569 A | 8/2000 | Andress |
| 6,234,162 B1 | 5/2001 | Wenker |
| 6,244,163 B1 * | 6/2001 | Lee .................... A47J 37/0623 |
| | | 219/400 |
| 6,827,077 B1 | 12/2004 | Haas |
| 6,868,849 B1 | 3/2005 | Endres |
| 70,007,687 | 3/2006 | Lewis |
| D574,177 S * | 8/2008 | Hulsey ................... F24B 1/202 |
| | | D7/335 |
| 7,445,004 B1 | 11/2008 | Milner |
| 8,151,784 B2 | 4/2012 | Czajkoski |
| 8,272,601 B2 | 9/2012 | Kocher |
| 8,550,065 B2 | 10/2013 | Johnson |
| 8,919,334 B2 * | 12/2014 | Glanville ............ A47J 37/0704 |
| | | 126/1 R |
| 9,198,538 B2 * | 12/2015 | Safar .................... A47J 37/0754 |
| 2004/0123857 A1 * | 7/2004 | Viraldo ................... F24B 1/202 |
| | | 126/9 R |
| 2008/0289511 A1 | 11/2008 | Mendez |

* cited by examiner

CAMPRFIRE GRILL APPARATUS

FIELD OF THE DISCLOSED TECHNOLOGY

The disclosed technology relates generally to device for cooking food over a campfire and more particularly, to a grill which hangs from a tripod system.

BACKGROUND OF THE DISCLOSED TECHNOLOGY

Enjoying time outdoors and camping is a favorite pastime of many. Cooking outdoors is required when camping and part of the fun of camping. Tripods to hang a grill over an open fire are old and well known. An improved grill apparatus that turns the food to the other side for even cooking and keeps the food from falling off the grill would be very effective. A grill apparatus having an easy on and off second grill member, a wall around the edge of the grill, and the ability to rotate a first grill member and a second grill member around an axis to cook the other side of food would achieve this goal.

An issue in cooking over an open fire using a tripod to suspend a grill is keeping the food on the grill. The grill can and usually does swing while it is suspended from wind or any movement that will affect the system. By having a wall around the outside edge of the grill, the food has another obstacle to overcome to prevent it from falling off. Further, by having a second grill member on top of a first grill member and the food between both grill members, would also hold the food in place on the grill.

Another issue with cooking over an open fire using a tripod system is keeping the food from falling off while flipping the food to be cooked on the other side. Both sides of the food require exposure to the flame to be cooked thoroughly and evenly. The grill rotates around an axis and the grill members rotate at least one hundred and eighty degrees such that the second grill member that was on top is now on the bottom. The food between two grill members and surrounded on the perimeter by a wall would keep the food from falling off.

Accordingly, there exists the need for new and useful methods and devices for cooking food on an open fire. It is, therefore, to the effective resolution of the aforementioned problems and shortcomings of the prior art that the disclosed technology is directed.

SUMMARY OF THE DISCLOSED TECHNOLOGY

The disclosed technology described herein addresses an unfulfilled need in the prior art by providing a method and apparatus for cooking food over an open flame using a tripod suspension system which keeps the food from falling off the grill system and allows for thorough and even cooking of the food.

One objective of the disclosed technology is to provide a grill apparatus with a first grill member; a wall permanently attached around the perimeter of the first grill member; and a center post attached to the center of the first grill member. The grill apparatus also comprises a bracket movably attached at two ends of the bracket to the wall; a removable second grill member having an aperture at the center for placing on the center post, such that when placed on center post it is directly over first grill member and inside the wall. A removable wing nut for placement on the center post after the second grill member such that when placed on center post it secures the second grill member on top of the first grill member. The grill apparatus hangs from a tripod over a fire.

Another objective is to have a grill apparatus with a first grill member wall movably connected on each end of the first grill member's widest part to the bracket, and first grill member and wall move 360 degrees around an axis between connections of the bracket to the wall, as well as between a half perimeter of the bracket. The grill members are circles and the bracket is a semi-circle and the semicircle radius and diameter is slightly bigger than the grill member radius, so that the bracket moves around the grill members and wall. The first grill member rests at any point around this axis.

The grill apparatus has at least one aperture to connect the grill apparatus to suspension wires from a tripod, such that the grill hangs over a flame. Also, the first grill member and second grill member with wing nut securing the second grill member onto center post is perpendicular to bracket hung from suspension wires to facilitate cooking of food over a fire. In addition, the first grill member and second grill member with wing nut securing the second grill member onto center post is rotated 180 degrees in relation to the bracket to facilitate cooking the other side of food with out the food falling off of the grill apparatus.

The connection is each of the two movable connection of the bracket to the wall is an aperture in the wall and each bracket end, having a post and two locking nuts on either side of the wall and bracket. The bracket has a handle to use to carry the grill apparatus.

Alternatively, there is a grill handle connected to second grill member such that second grill member has a place to grip and to lift the second grill member off of the first grill member. The grill apparatus is made from black steel.

In yet another objective the grill apparatus, a method of using a grill apparatus to cook food comprises setting up a tripod and suspension wires to hand a grill apparatus from and starting a fire. Grill apparatus second grill member secured to center post by wing nut and carrying the grill apparatus to the tripod by the handle and having the bracket in a position parallel to the wall. Then moving bracket to a position parallel to first and second grilling members and wall and first grilling member being on the bottom.

The suspension wires are then attached onto the bracket and wing nut is removed from the center post. Second grill is removed from center post and food is placed on first grill and placing aperture of second grill on center post. Securing the food between first and second grill by placing second grill on top of food and placing wing nut onto center post and exposing food to fire on first side. Then rotating first and second grill members and wall 180 degrees in relation to bracket with second grill member on the bottom and parallel to the ground, which exposes the second side of food to the fire for cooking.

It is also an object of the disclosed technology that the to disclose a method of removing cooked food from grill. Rotating first and second grill members and wall 180 degrees back such that first grill member is parallel to the ground and removing the grill apparatus from the suspension wires and placing it on a safe surface for hot metal. Removing wing nut from center post and removing second grill member from center post. Finally, removing food from top of first grill member.

Alternatively, the food can be removed while grill apparatus is still handing from tripod. Rotating first and second grill members and wall 180 degrees back such that first grill member is parallel to the ground. Removing wing nut from center post removing second grill member from center post; removing food from top of first grill member.

Another objective is to have easy transportation of grill apparatus. Placing second grill member onto center post and securing second grill member on top of first grill member by placing wing nut on center post. Rotating first and second grill member with wall to a position wherein the wall and bracket are parallel, and using handle to carry grill apparatus any storage place.

In a final and alternative storage method. The grill is on suspension wire and the second grill member is placed onto center post. Securing second grill member on top of first grill member by placing wing nut on center post, and removing grill apparatus from suspension wires. Now rotating first and second grill member with wall to a position wherein the wall and bracket are parallel to use handle to carry grill apparatus any storage place.

In accordance with these and other objectives, which will become apparent hereinafter, the disclosed technology will now be described with particular reference to the drawings.

Figure 1:
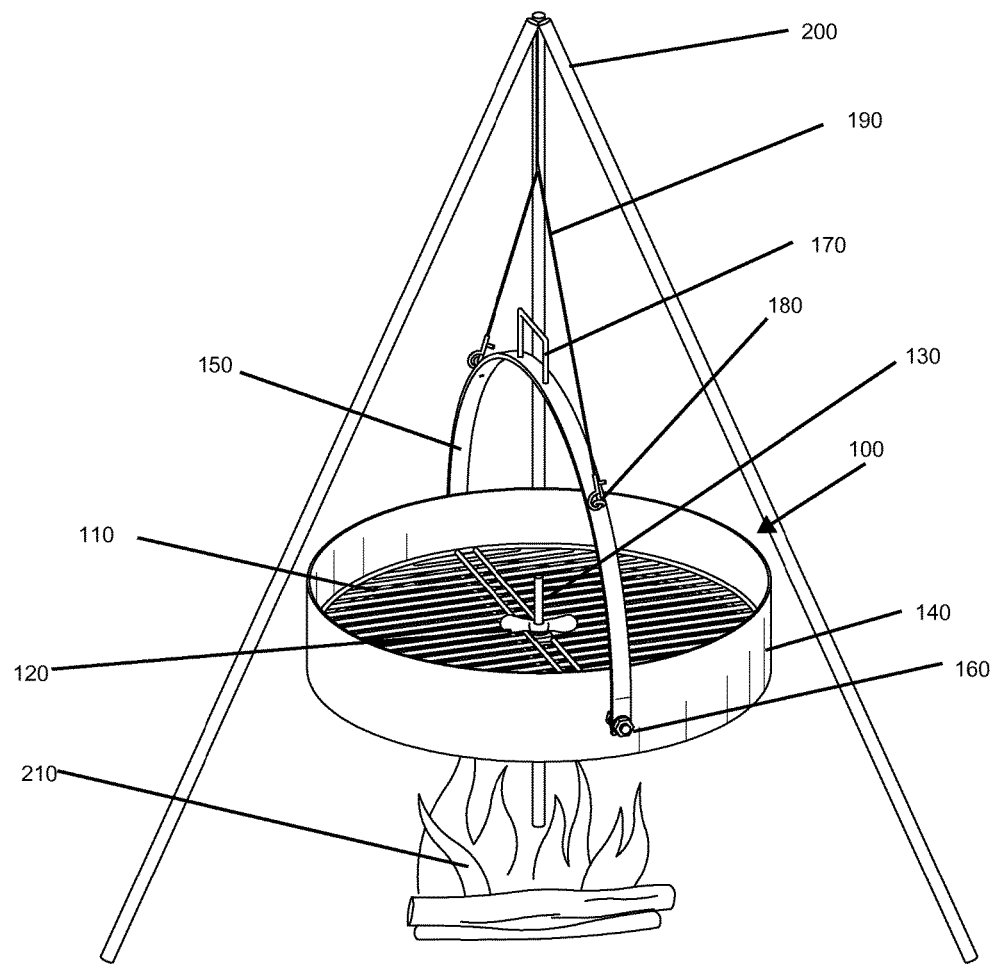
FIG. 1 shows a perspective view of the grill apparatus device of the disclosed technology hanging on a tripod suspension system.

A better understanding of the disclosed technology will be obtained from the following detailed description of the preferred embodiments, taken in conjunction with the drawings and the attached claims.

DETAILED DESCRIPTION OF EMBODIMENTS OF THE DISCLOSED TECHNOLOGY

The ensuing detailed description provides preferred exemplary embodiments only, and is not intended to limit the scope, applicability, or configuration of the disclosed technology. Rather, the ensuing detailed description of the preferred exemplary embodiments will provide those skilled in the art with an enabling description for implementing the preferred exemplary embodiments of the technology. Various changes may be made in the function and arrangement of elements without departing from the spirit and scope of the disclosed technology, as set forth in the appended claims.

To aid in describing the disclosed technology, directional terms may be used in the specification and claims to describe portions of the present technology (e.g., upper, lower, left, right, etc.). These directional definitions are merely intended to assist in describing and claiming the disclosed technology and are not intended to limit the disclosed technology in any way. In addition, reference numerals that are introduced in the specification in association with a drawing figure may be repeated in one or more subsequent figures without additional description in the specification, in order to provide context for other features.

With reference now to the drawings, a device is shown for a grill system.

Figure 3:
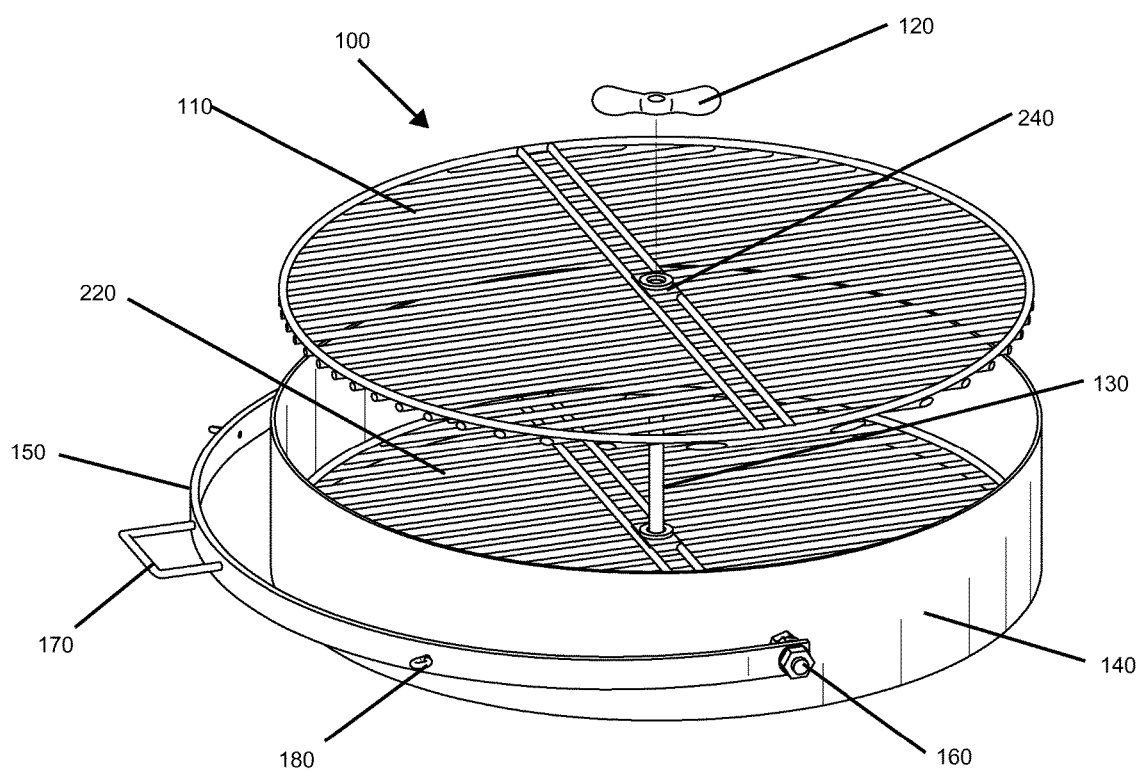
FIG. 3 is a perspective view of the grill apparatus device of the disclosed technology.

Referring to FIG. 1, reference number 100 refers generally to a grill apparatus. Grill apparatus 100 is shown and comprises a second grill member 110 having an aperture 240 (FIG. 3). Grill apparatus 100 also comprises a nut easily movable by hand 120 on a center post 130. The easily movable nut 120 is preferably a wing nut. A wall 140 is around the periphery of the grill member 110 and grill member 220 as seen in FIG. 3.

A semi circular bracket 150 movably connects to wall 140 with lock nuts 160. Semi circular bracket 150 further comprises a handle 170 at the apex of the semi circular bracket 150. This handle 170 is for carrying of the grill apparatus 100 when not suspended from the suspension wires 190.

The semi circular bracket 150 also has protrusion apertures 180 to hook suspension wires 190 into. Suspension wires 190 suspend from tripod 200 allowing grill apparatus 100 to hang over flame 210. The semi-circular bracket 150 is located perpendicular to grill members 110 and 220 in an upper position when hanging from suspension wires 190, so the grill apparatus 100 can be used for cooking. The semi-circular bracket 150, after disconnected from suspension wire 190, is rotated to a lowered position as seen in FIG. 3 parallel to sidewall 140 for carrying.

The grill apparatus 100 is any symmetrical shape but preferably circular. In alternative embodiments the grill apparatus 100 as well as grill members 110 and 220 are all square, rectangular or oval. Any symmetrical shape of a grill known in the art is utilizable. When the grill is made in different shapes, the semi circular bracket 150 would be a semi square, rectangle or oval depending on the shape of the grill members 110 and 220. The grill apparatus 100 is made of any metal but preferably black steel. In another embodiment the grill apparatus is made of a metal coated with materials normally used in non-stick cooking utensils.

The semi-circular bracket 150 is attached to the outside of the wall 140 on opposite sides of the grill apparatus 100 with lock nuts 160. Each end of the bracket 150 is attached to the side wall 140 with lock nuts 160 such that the bracket 150 is secured on both the inside and the outside of wall 140. These lock nuts 160 are crimped such that they stay in place once the appropriate tension is set.

Figure 2:
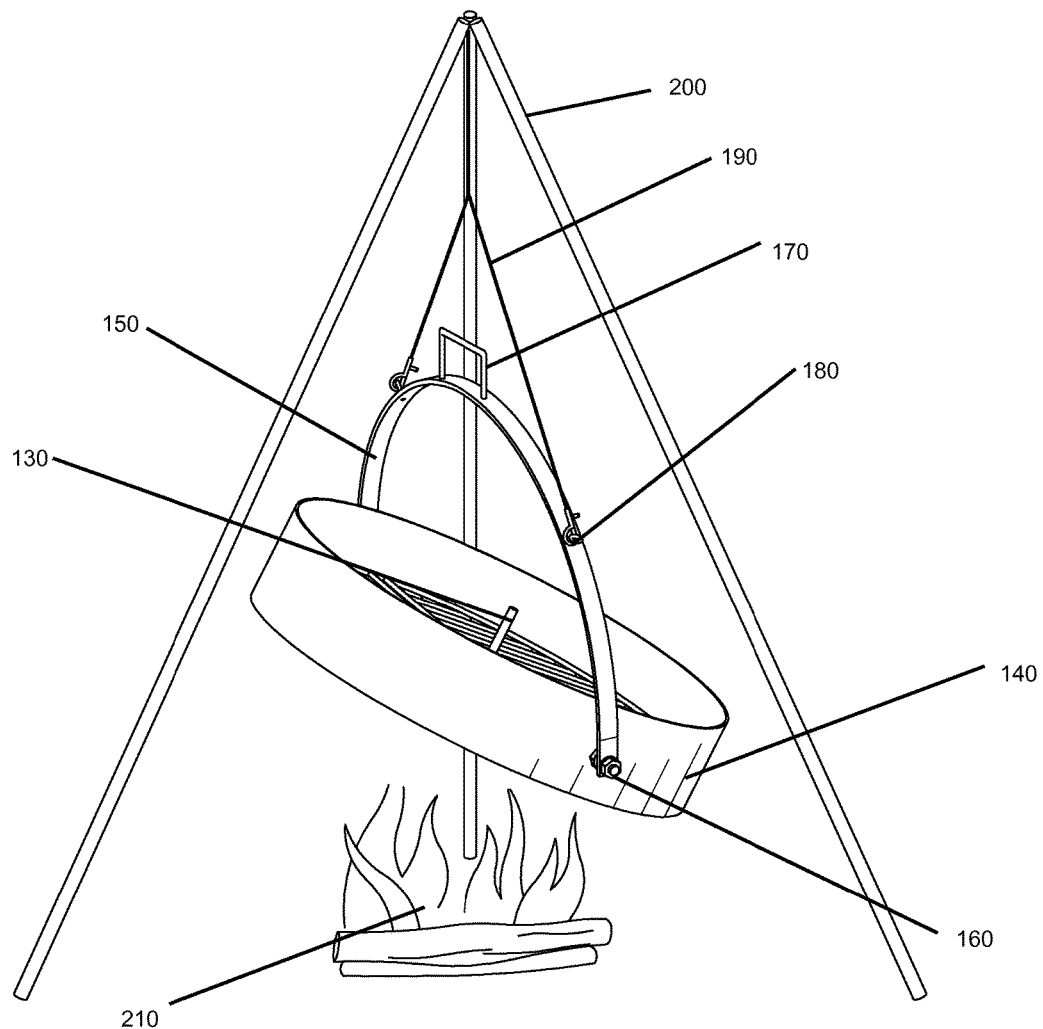
FIG. 2 shows a perspective view of the grill apparatus device of the disclosed technology in a stage of turning around an axis while hanging on a tripod suspension system.

FIG. 2 illustrates the grill apparatus 100 while the wall 140 and grill members 110 and 220 pivot and rotate three hundred and sixty degrees around an axis between the locking nuts 160. The grill members 220 and 110 along with wall 140 stay wherever left on the axis because of the tension set on the lock nuts 160. The rotation of the grill apparatus 100, once the food is placed between grill member 110 and 220, facilitates exposure to the flame on both sides of the food with little chance of food falling off the grill.

Referring now to FIG. 3 a first grill member 220 is shown. Food is placed on first grill member 220 then second grill member 110 is fit onto center post 130 and placed on top of the food to be cooked. Wing nut 120 is then placed on center post 130 and screwed down to secure the food between first grill member 220 and second grill member 110. The bracket 150, when adjacent to the wall 140 is used to carry the grill apparatus 100.

The wall 140 is any height between 2 and 8 inches but preferably is 4 inches high. The width of the wall 140 is preferably $1/16^{th}$ inches thick but can be any thickness up $1/4$ of an inch. Preferably, the wing nut 120 is one inch by one inch square tubing and a quick threaded $5/16^{th}$ of an inch nut welded on the top of the wing nut. Any dimension in this range will work well.

The bracket 150 is preferably $1/2$ inch wide by $1/8^{th}$ inch thick. Dimensions in the range of $1/8^{th}$ inch wide to one inch thick will do just as well. Also, dimensions in the range of $1/8^{th}$ inch to $1/2$ inch thick would work. The length of the semi circle bracket 150 would be dependent on the circumference or perimeter of the grill members 110 and 220 since it has to fit around the grill members shape.

Figure 4:
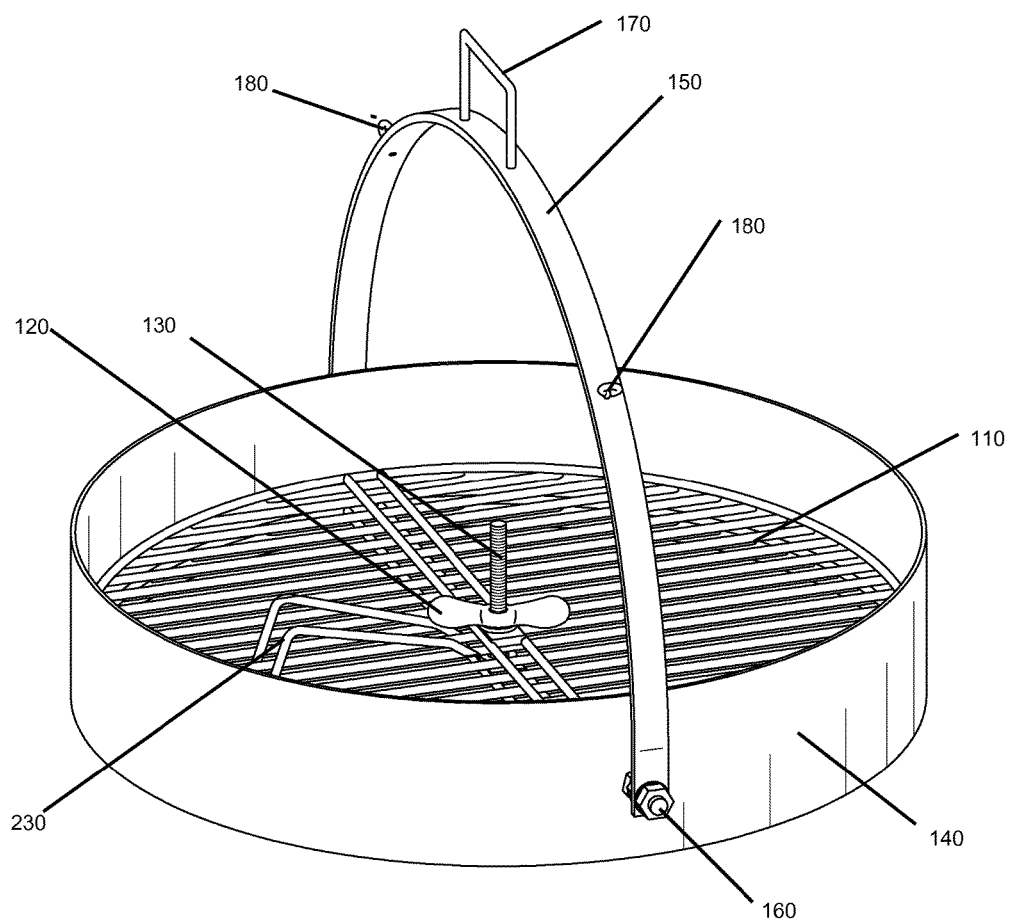
FIG. 4 is a perspective view of another embodiment of the disclosed technology.

FIG. 4 illustrates a second embodiment wherein there is a second handle 230 on second grill member 110. This second handle 230 facilitates the easy placement and removal of the second grill member 110 from post 130.

Method of using the grill apparatus 100. First a user would set up the tripod 200 and suspension wires 190 as is know in the art of cooking over an open flame. A fire would then need to be started. The grill apparatus 100 would then be carried to the tripod 200. Semi-circular bracket 150 would be in the lowered position that is parallel to the wall 140 for easy carrying by handle 170.

The bracket 150 would then be moved toward an upper position which is perpendicular to the grill members 110 and 220 making sure that the lowered grill member 220 is at the bottom. Hooks of suspension wire 190 will then be hooked to protrusion apertures 180. At this point the wing nut 120 would be removed from center post 130 and this allows upper grill 110 to also be removed from center post 130.

Now food would be placed on first grill member 220. Second grill member 110 would be placed back on center post 130 and wing nut 120 would be placed above grill member 110 on center post 130. Wing nut 120 is securely screwed down, trapping the food between grill members 110 and 220 and the wall 140 keeping the food from slipping out the grill apparatus 100 edge. Once the first side of the food exposed to the fire is cooked, the user will rotate the two grill members 110 and 220, as well as the wall 140 one hundred and eighty degrees, through the semi circular bracket 150. This will expose the other side of the food to the fire. In an alternative method, one could also place the food between grill members 110 and 220 before placing the grilling apparatus 100 on the suspension wires 190.

Once the food is cooked on both sides, the grill members 110 and 220 as well as the wall 140 are rotated back 180 degrees in order to remove the food. At this point, one option is to remove the whole grill apparatus 100 from the suspension wires and put it on a non-flammable surface. Alternatively, the grill apparatus 100 stays on suspension wires 190. The wing nut 120 would be removed from the center post 130. After that, the second grill member 110 will be removed from the center post 130 and the cooked food is removed from the grill member 220 to serve and eat.

For any step that requires touching the hot metal, safety gloves or other well know implements used to avoid burning a person should be employed. Once the grill apparatus 100 cools down, it is removed from the suspension wires 190 if that was not already done, and after that the bracket 150 is rotated to the lowered carrying position for easy transport.

It is recognized by those skilled in the art that changes may be made to the embodiments described above of the disclosed technology without departing from the broad inventive concept thereof. It is understood, therefore, that this technology is not limited to the particular embodiments disclosed, but is intended to cover all modifications, which are in the spirit and scope of the disclosed technology.

I claim:

1. A grill apparatus comprising:
   a first grill member adapted for placement of food thereon;
   a wall permanently attached around the perimeter of the first grill member;
   a center post attached to the center of the first grill member;
   a bracket movably attached at two ends of the bracket to said wall such that the bracket is positioned outside and adjacent to said wall;
   a removable second grill member adapted for placement of food thereon, said second grill member having an aperture at the center for placing on the center post such that when placed on the center post it is directly over the first grill member and inside the wall;
   a removable wing nut for placement on the center post after the second grill member such that when placed on the center post it secures the second grill member on top of the first grill member, so that food can be disposed between the first grill member and the second grill member;
   wherein the grill hangs by said bracket from a support point above a fire; and
   the first grill member wall is movably connected on each end of the first grill member's widest part to the bracket, and the first grill member and wall move 360 degrees around an axis between connections of the bracket to the wall, as well as between a half perimeter of the bracket.

2. The grill apparatus of claim 1, wherein the grill hangs from a tripod over a fire.

3. The grill apparatus of claim 1, wherein the grill members are circles and the bracket is a semi-circle and the semicircle radius is slightly bigger than the grill member radius so that the bracket can move around the grill members and wall.

4. The grill apparatus of claim 1, wherein the first grill member rests at any point around the axis.

5. The grill apparatus of claim 1, where in each of the two movable connection of the bracket to the wall is an aperture in the wall and each bracket end, having a post and two locking nuts on either side of the wall and bracket.

6. The grill apparatus of claim 1, wherein the bracket has a handle to use to carry the grill apparatus.

7. The grill apparatus of claim 1, wherein there is a grill handle connected to the second grill member such that the second grill member has a place to grip and to lift the second grill member off of the first grill member.

8. The grill apparatus of claim 1, where in the grill apparatus is made from black steel.

9. The grill apparatus of claim 1, wherein the bracket has at least one aperture to connect the grill apparatus to suspension wires from a tripod over a flame.

10. The grill apparatus of claim 9, wherein the first grill member and the second grill member, while the second grill member is secured onto the center post with the wing nut, are arranged perpendicular to the bracket, when the bracket is hung from suspension wires, to facilitate cooking of food, disposed between the first grill member and the second grill member, over a fire.

11. The grill apparatus of claim 10, wherein the first grill member and the second grill member, while the second grill member is secured onto the center post with the wing nut, are rotated 180 degrees in relation to the bracket to facilitate cooking the other side of the food disposed between the first grill member and the second grill member without the food falling off of the grill apparatus.

12. The grill apparatus of claim 9, wherein said bracket has at least one protrusion extending outwardly therefrom, and said at least one aperture is formed in said at least one protrusion.

* * * * *